(12) United States Patent
Fritz et al.

(10) Patent No.: US 10,252,419 B2
(45) Date of Patent: Apr. 9, 2019

(54) SYSTEM AND METHOD FOR ROBOTIC DELIVERY BETWEEN MOVING TARGETS

(71) Applicant: Savioke, Inc., San Jose, CA (US)

(72) Inventors: Christian Fritz, Menlo Park, CA (US); Adrian Canoso, Sunnyvale, CA (US); Robert S. Bauer, Portola Valley, CA (US); Izumi Yaskawa, Sunnyvale, CA (US); Steve Cousins, San Jose, CA (US)

(73) Assignee: Savioke, Inc., San Jose, CA (US)

( * ) Notice: Subject to any disclaimer, the term of this patent is extended or adjusted under 35 U.S.C. 154(b) by 0 days.

(21) Appl. No.: 15/584,009

(22) Filed: May 1, 2017

(65) Prior Publication Data
US 2018/0311820 A1 Nov. 1, 2018

(51) Int. Cl.
*B25J 9/16* (2006.01)
*G05D 1/00* (2006.01)
*G05D 1/02* (2006.01)

(52) U.S. Cl.
CPC .......... *B25J 9/1664* (2013.01); *B25J 9/161* (2013.01); *G05D 1/0088* (2013.01); *G05D 1/0274* (2013.01)

(58) Field of Classification Search
CPC .......... B64C 2201/128; G06Q 10/0832; G05B 19/41895; B25J 11/009
See application file for complete search history.

(56) References Cited

U.S. PATENT DOCUMENTS

| | | | | |
|---|---|---|---|---|
| 5,959,574 A | * | 9/1999 | Poore, Jr. | G01S 13/726 342/96 |
| 6,382,554 B1 | * | 5/2002 | Hagelin | F41G 7/343 244/3.15 |
| 9,741,010 B1 | * | 8/2017 | Heinla | G06Q 10/083 |
| 2011/0231016 A1 | * | 9/2011 | Goulding | G06N 3/008 700/246 |
| 2012/0123668 A1 | * | 5/2012 | Spinelli | G05D 1/104 701/120 |
| 2013/0110281 A1 | * | 5/2013 | Jones | G06Q 10/08 700/228 |
| 2014/0136414 A1 | * | 5/2014 | Abhyanker | G06Q 50/28 705/44 |

(Continued)

*Primary Examiner* — Ryan Rink
(74) *Attorney, Agent, or Firm* — Hickman Palermo Becker Bingham LLP

(57) ABSTRACT

A robot for delivering items within a building or within a prescribed radius of a building are provided. A method comprises receiving a task indicating a non-stationary origin and a destination; identifying a current location of the non-stationary origin by interrogating a remote computer associated with the non-stationary origin for the current location of the non-stationary origin; moving towards the current location of the non-stationary origin; determining that the non-stationary origin has changed location by interrogating the remote computer associated with the non-stationary origin for an updated current location of the non-stationary origin; predicting a next location of the non-stationary origin using an artificial intelligence prediction algorithm; determining that the robot has arrived at the origin; detecting an interaction with the robot that is associated with introducing an item to or removing an item from a storage compartment in the robot; moving towards the destination inside of the building.

22 Claims, 4 Drawing Sheets

(56) References Cited

U.S. PATENT DOCUMENTS

| | | | |
|---|---|---|---|
| 2014/0254896 A1* | 9/2014 | Zhou | B25J 9/0006 |
| | | | 382/124 |
| 2015/0006005 A1* | 1/2015 | Yu | G06Q 10/08 |
| | | | 701/22 |
| 2015/0227882 A1* | 8/2015 | Bhatt | G06Q 10/083 |
| | | | 705/330 |
| 2016/0187886 A1* | 6/2016 | Jones | G06Q 10/08 |
| | | | 701/26 |
| 2016/0250933 A1* | 9/2016 | Kim | B60L 11/182 |
| | | | 320/108 |
| 2017/0242438 A1* | 8/2017 | Chan | G05D 1/0212 |
| 2017/0286892 A1* | 10/2017 | Studnicka | G06Q 10/083 |
| 2017/0300855 A1* | 10/2017 | Lund | B64C 39/024 |

* cited by examiner

SYSTEM AND METHOD FOR ROBOTIC DELIVERY BETWEEN MOVING TARGETS

FIELD OF THE DISCLOSURE

The present disclosure relates to mobile digital computer controlled robots that autonomously navigate a building in order to complete a delivery or pick-up task.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Robots are no longer only used in manufacturing. Increasingly, robots have been used in hospitality, medicine, and transportation of goods. Some robots, such as those designed and manufactured by Savioke, Inc. of San Jose, Calif., are wheeled machines that transport goods within a campus, such as a hotel or hospital. These robots are deployed by computer or human operators to complete a task, such as delivering hot towels to a guest room. Once deployed, a particular robot may navigate a building or a set of buildings from its current location to its destination.

In order to navigate to its destination, the robot uses data defining a layout of the campus or environment. The data may be stored in the form of a digital map of a campus, building, or floor within a building. However, the robot may be limited to delivering to a stationary target such as a guest room. There is a need in the robotics field to provide robot navigation to mobile targets.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In one embodiment, digital computer controlled electro-mechanical robots may be deployed, for example, within a building or campus to transport items between people or locations. A robot may be programmed to dynamically change its destination based on real-time information about a recipient's location, whether inside a building or outside the building. The robot may be programmed to change its route until it arrives at the recipient.

Brick and mortar stores are struggling to compete with online retailers. Some brick and mortar retailers provide a curbside pick-up service in which employees retrieve items from the store and allow a user to pick-up the items outside of the store by pulling up to a curb and allowing an employee to load the items into the user's car. However, the logistics and labor required for curbside pickup can keep it from being cost effective. In an embodiment, a robot of the present disclosure may be combined with a scheduling system to improve the delivery process. The robot may bring the items from the store out to the curb just in time for the user to arrive and receive the items. The robot may use automatic door openers, tents or other more permanent covers over the sidewalk to protect the items and the robot.

When receiving deliveries, it can be a burden on the recipient to wait in a specific location until the delivery arrives. Furthermore, the sender does not always know where the recipient will be at time of arrival of the item, which is further exasperated by a lack of accurate prediction for delivery arrival time. As a result, recipients need to track an incoming delivery (if tracking is available), and then make sure to be in the designated destination location at the estimated time of arrival.

In some instances, the robot may deliver items to people without requiring them to await delivery at any particular location. Using a robot and by tracking the recipient's real-time location, e.g., from his mobile phone, the system delivers the item to the person wherever he is, as long as he is within the bounds of the area the robot may navigate. The robot is guided by a computing device that is programmed to: 1) continuously predict the near-future real-time location of the recipient based on past location traces, and 2) continuously re-calculate a route in order to meet or "intercept" the recipient along his tracks.

2. Networked Environment

Figure 1:
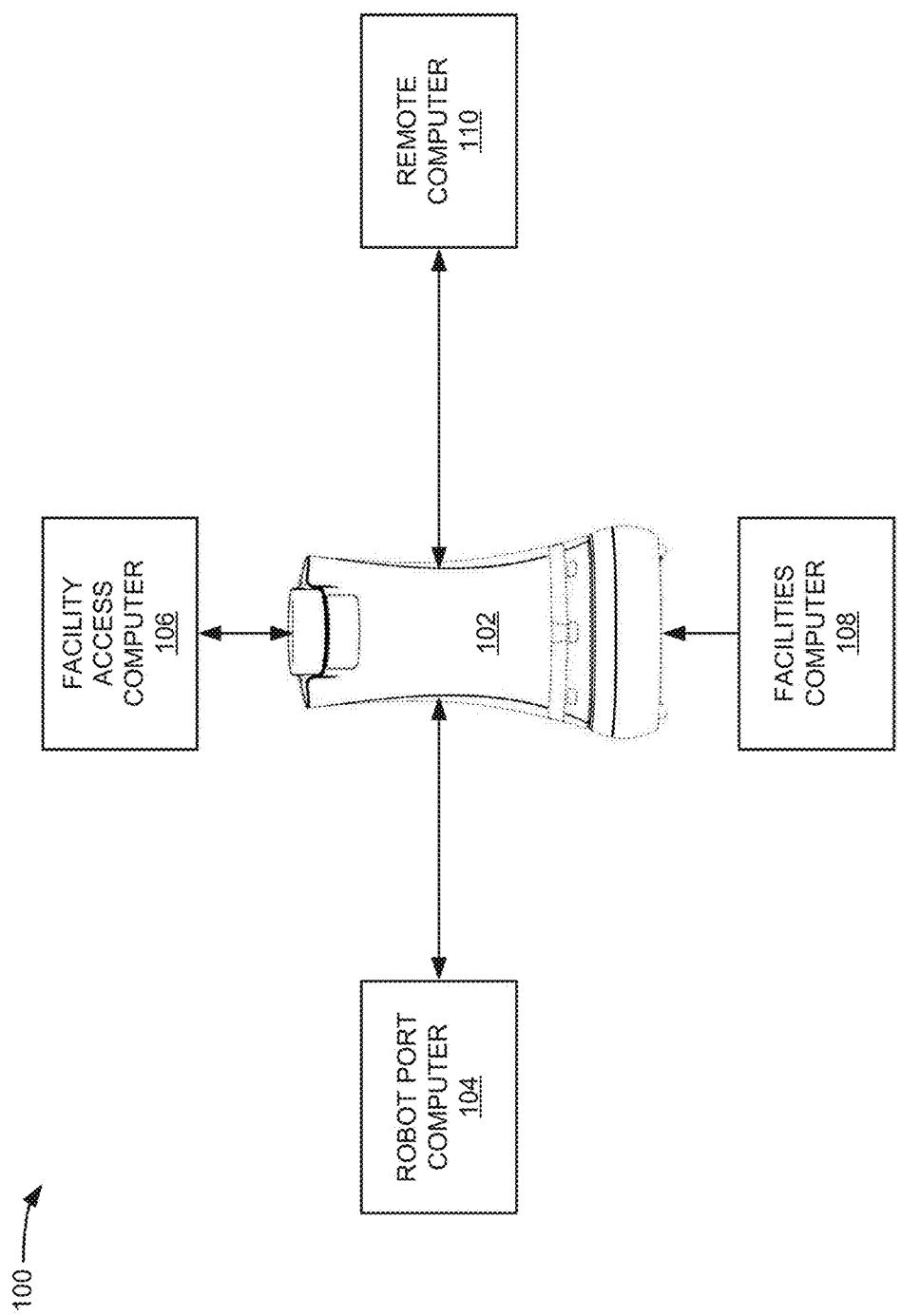
FIG. 1 is a diagram of a networked environment in which a robot may operate, according to various embodiments.

FIG. 1 is a diagram of an example networked environment in which a robot may operate, according to various embodiments.

The networked environment 100 of FIG. 1 provides certain computing infrastructure to support a robot 102, to allow the robot 102 to access building features such as locked doors or elevators, and to allow an operator to communicate directly with the robot 102. The networked environment 100 includes the robot and one or more computers that are local to the building or campus in which the robot is deployed. In some embodiments, remote computers may be included in the networked environment 100. The local computers within the networked environment 100 may be physically present in the building.

In this example, the robot 102 is an autonomous, wheeled, battery-powered electro-mechanical robot under control of a programmed digital computer contained in the robot. The robot 102 moves using a set of wheels mounted on the bottom surface of the robot. The robot 102 may move at velocities appropriate to its environment, typically at a human walking speed or slower. In some embodiment, in areas with less human activity, for example hallways where lights are turned off because motion sensors have not been recently activated, the robot 102 may move at higher speeds. The wheels of the robot 102 may be selected for performance on a variety of indoor and outdoor surfaces including tile, carpet, and concrete.

In some embodiments, robot 102 includes at least one storage compartment that can be electronically opened by the robot for access by an operator or human at an origin or destination. The storage compartment may be sized to hold items that are appropriate to the environment. For example, in hospitality applications, the storage compartment may permit carrying any of: linens; toiletries; medications; magazines and reading materials; lost and found items such as wallets, keys, and personal electronic devices.

The storage compartment may have an electronic lock that is controlled by the robot 102. In some embodiments, the robot 102 is programmed to open the storage compartment upon arriving at its destination or in response to an instruction or sensor when the destination is reached. The instruction may include, for example, a passcode; a confirmation of the person's identity at the destination; an electronic communication with a personal electronic device of the person receiving the delivery via, for example, RFID or Bluetooth. The storage compartment may include a scale, pressure switch, or other mechanism to detect the placement or removal of items in or from the storage compartment, such that placing an item in the compartment depresses the scale or triggers the switch, and removing the item from the compartment releases the scale or the switch. A digital interface may gate or latch a signal from the scale or switch to instruct the computer in the robot that an item was placed on or removed from the compartment.

In some embodiments, robot 102 includes a touchscreen that provides a graphical user interface (GUI) to communicate messages to humans. Robot 102 may be programmed to receive instructions in response to input received via the touchscreen. For example, instructions may include an instruction to open the storage compartment, a response to a request for information presented by the robot during an autonomous mapping operation; a confirmation that the item, or the correct item, is in the storage compartment and is delivered. In some embodiments, robot 102 may include other input mechanisms such as keyboards, buttons, switches, or audio sensors for voice commands.

In an embodiment, the robot 102 includes numerous sensors for receiving data about the building and its location within the building. These sensors may include, for example, laser sensors, Light Detection and Ranging (LIDAR) position or motion sensors, 3D cameras, color cameras, barometers, altimeters, accelerometers, and others. In an embodiment, the laser sensors, LIDAR, 3D cameras, and color cameras collect data that can be transformed under program control to form a model of an environment and its obstructions or objects; dimensions of features such as rooms, hallways, doors, and windows; and identification of features including staircases, elevators, doorways, signs, and fiducials. In an embodiment, a barometer detects an altitude of the robot 102 based on digitally transforming a reading of ambient atmospheric pressure and provides data that may be used, for example, to identify a floor on which the robot 102 is currently located if the environment is multi-story. In an embodiment, the accelerometer provides data about the speed and/or direction of the movement of the robot 102, alone or in combination with a digital compass.

In an embodiment, the robot 102 includes one or more network interfaces that communicate with the computers within the networked environment 100. The network interfaces may include interfaces that communicate via Wireless Fidelity (WIFI), 3G and/or 4G modems, Bluetooth, infrared, and low-bandwidth radio. In some embodiments, the robot 102 uses a Global Positioning System (GPS) to determine its location. In some embodiments, the robot 102 may communicate with building features using the one or more network interfaces. For example, robot 102 may use WIFI to open doors or to call and direct an elevator.

In one embodiment, robot 102 executes mapping software stored in memory. The mapping software, when executed, causes the robot 102 to generate a robot-readable map of its location and/or a route to a destination. In and embodiment, the mapping software instructs the robot 102 to traverse or explore its environment using the onboard sensors. In an embodiment, based on the traversal, the mapping software generates a map of a floor or other environment. In an embodiment, data representing locations in the environment, objects or obstacles may be stored in association with cost values or weight values.

In an embodiment, the environment includes a robot port having a robot port computer. The robot port is a device in which, or next to which, the robot 102 returns when not in use. In an embodiment, the robot port may include connections to which the robot 102 can automatically connect and that charge a battery of the robot 102.

For example, the robot and port may be structured to enable the robot to automatically contact the power connections when the port is reached or mechanically engaged.

In an embodiment, the port further comprises a data interface and data connector to which the robot 102 may automatically connect or engage when the robot is in the port. In an embodiment, using the data interface the robot port computer 104 may download from the robot 102 data comprising a list of deliveries, a history of the robot's, and communications between the robot and other computers or received via the GUI. In some instances, the robot port computer 104 may upload data to the robot 102 including, for example, software updates, map or facility updates, and data used to identify building-specific features such as doors. In some embodiments, port computer 104 is programmed to obtain, via a network, environment data for environments other than the one in which robot 102 is located, including traversal data obtained from other robots that have operated in other environments. The other environments may be closely similar to the local environment or different. For example, if the local environment is a building structure that has been constructed according to a plan that has been replicated to construct other similar buildings in other locations, then traversal data obtained from other robots that are geographically distant may be relevant in resolving traversal of obstructions or features of the local environment. Furthermore, robot port computer 104 may act as an intermediary to communicate data between robots 102 deployed within the building or on campus.

In an embodiment, a facilities access computer 106 provides access to building features that accommodate the robot 102. The facilities access computer 106 may provide an application programming interface (API) that the robot 102 is programmed to call with instructions and data configured to direct the facilities access computer to operate elevators, request operation of electronic doors, or control security sensors. In an embodiment, the facilities access computer 106 communicates with the electronic systems within the building such as elevators, door locks, door opening systems, security sensors, and the like.

In an embodiment, facilities computer 108 is programmed with supervisory functions for one or more robots 102, and provides an interface for an operator to communicate with the robot. The facilities computer 108 may be programmed to respond to requests made by the robot 102 during autonomous mapping. The facilities computer 108 may deploy the robot 102 on pick-ups, deliveries, or other tasks.

In some embodiments, the facilities computer 108 may provide data regarding the location of temporary obstacles in the environment. Examples includes holiday decorations, large crowds, and temporary installations. In some embodiments, the facilities computer 108 is programmed to receive data from sensors around the building or campus including, for example, moisture sensors, smoke detectors, security cameras, and the like. Additionally, the facilities computer 108 may have access to data describing the time and location of scheduled events such as carpet cleanings, irrigation schedules, and ongoing construction. The data may be maintained in a persistent memory or database and associated with an anticipated expiration date and/or time. The data may be communicated directly to the robot 102 via wireless communications or using the robot port computer 104.

In an embodiment, a remote computer 110 in FIG. 1 comprises a computer that is not local to the robot 102. Additionally or alternatively, the remote computer 110 may not be located within the building or campus in which the robot 102 is deployed. In an embodiment, a remote computer 110 may communicate data to the robot 102 such as, for example, weather data, news and public interest stories, other sources that provide data used by the robot 102. In some instances, the remote computer 110 may be connected to cameras, RFID readers, or other sensors within the building or campus in which the robot 102 is deployed, that can detect a user and determine, based on data collected by the sensors, a location of the user within the building or campus. In some instances, a remote computer 110 may be, or communicate with, a personal electronic device of a human user who has arranged a delivery. In such instances, the remote computer 110 may be a Short Message Service (SMS) server, Multimedia Message Service (MIMS) server, a web server, or an application server.

In some instances, the remote computer 110 is a personal electronic device, such as a GPS-enabled smartphone. The smartphone may execute an application that accesses the GPS data of the smartphone. The application provides the GPS data to the robot 102 so that the robot 102 has real-time information about the location of the smartphone and, assuming that the user carries the smartphone, the location of the user.

3. Delivery Process

Figure 2:
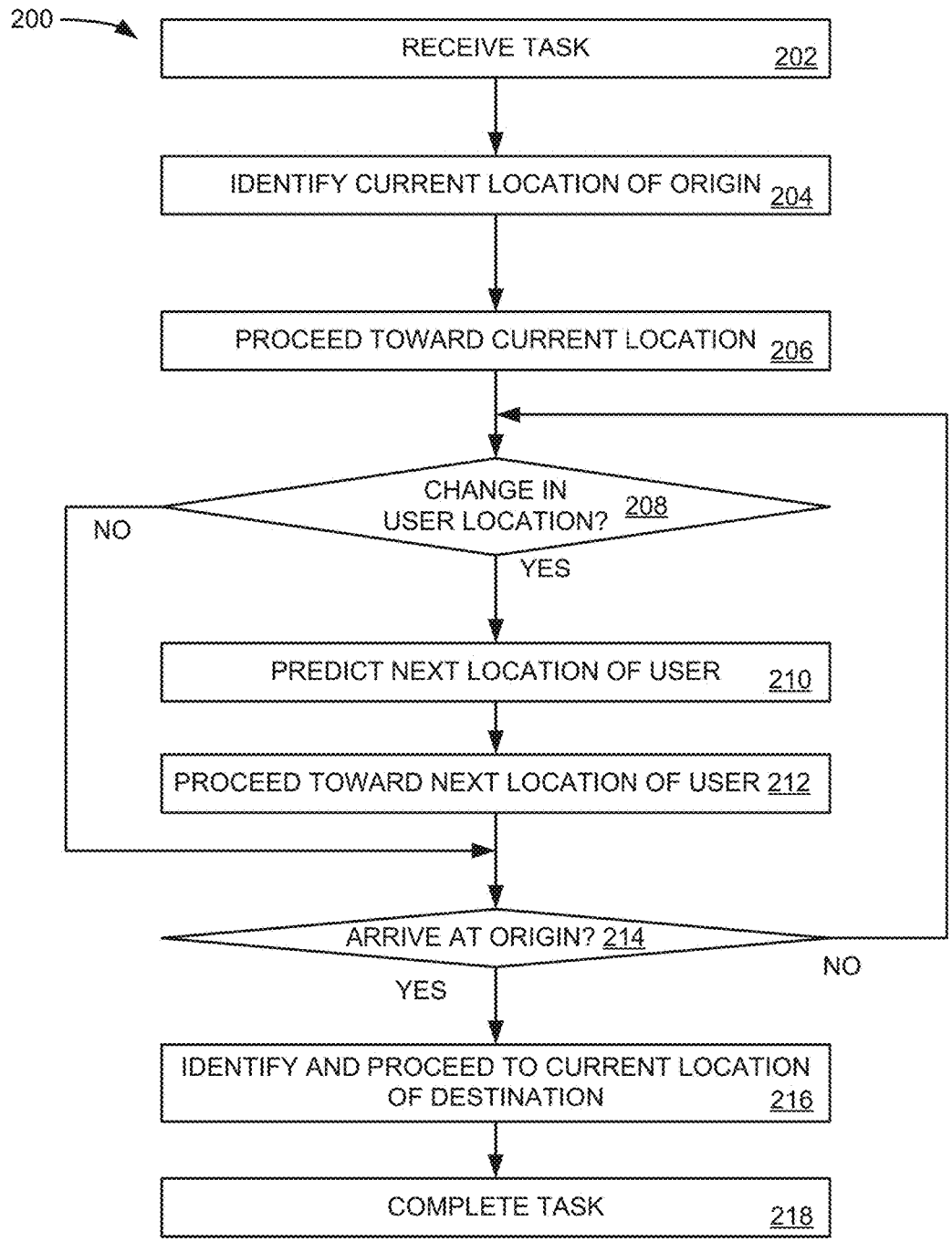
FIG. 2 is a flowchart of an example process for delivering to a moving target within a building, according to some embodiments.

FIG. 2 is a flowchart of an example process 200 for delivering an item to a moving target within a building or campus, or between buildings, according to some embodiments. The process 200 is performed by a robot 102. The robot 102 may have an onboard memory that stores information that enables navigation, such as a digital map. The digital map may include descriptions and/or labels of one or more building features such as doors, elevator doors, signage, fiducials, stairways, and the like that are used by the robot 102.

In an operation 202, the robot 102 receives a task to transport an item from an origin to a destination. The task may include picking-up an item from an origin and delivering the item to a destination. For example, the task may include meeting a driver curbside to pick-up an item for delivery to a person who lives or works in a building. Other tasks may include picking up an item from a stationary drop-off location inside or outside of a building and delivering the item to a person who is moving, or able to move, within the building.

Some tasks may include picking up an item from a person who is on the move and delivering the item to a stationary drop-off location. A stationary drop-off location may be, for example, a reception desk, a drive-thru window, a deposit box, a mailroom, a storeroom, or the like. In some buildings, a stationary drop-off location may be staffed by a human who can load the item to or unload the item from the robot 102.

The origin and/or destination may each be stationary or non-stationary. A non-stationary origin or destination may be based on the location of a human who is moving towards or around a location, for example, a driver of a car, a bicyclist, pedestrian, or a person who may be moving around within a building.

An origin location may be stationary or non-stationary. An example of a non-stationary origin location is a delivery vehicle that is delivering items from outside of the building. The robot 102 may receive the task before the delivery vehicle has arrived at the building. The robot 102 may determine an estimated arrival time such that the robot 102 arrives at the curb just before the delivery vehicle arrives. A non-stationary origin may also be a person approaching the building from outside of the building or another part of the building.

Similarly, a destination location may be stationary or non-stationary. An example of a non-stationary destination location is a person who lives or works in the building. The person may have a habitual location such as a residence, office, cubicle, or station but may move within the building during the day. The non-stationary destination may also be a vehicle or person outside of or near the building, such as on a curb, sidewalk, parking lot, loading zone, or other outside area associated with the building.

In some embodiments, the task may include a future time when the task is to be performed. In which case, the robot 102 may begin determining a time at which a non-stationary origin will be at an anticipated location. The anticipated location may be an exact location on a curbside, in a lobby, or on a sidewalk.

In an operation 204, the robot 102 identifies a current location of the stationary or non-stationary origin. If the task of operation 202 has a stationary origin, the robot 102 proceeds to the stationary origin. If the task of the operation 202 has a non-stationary origin, the robot 102 identifies the current location of the origin. This location may include, for example, a current location of a person's smartphone or other mobile computing device. The robot 102 may determine an exact location of a smartphone using, for example, WIFI or GPS triangulation, or a beacon emitted by the smartphone. Additionally or alternatively, robot 102 may locate a person based on facial recognition or optical character recognition (OCR) of a vehicle license plate associated with the person. For example, a camera connected to or accessed by robot 102 may capture or stream images or video of a street. Robot 102 may use images or video received from the camera to identify a vehicle associated with the origin and determine a location of the vehicle.

In an operation 206, the robot 102 proceeds to the current location of the origin. Concurrently, in an operation 208, the robot 102 determines whether there is a change in origin location. Additionally or alternatively, the robot 102 may determine whether the origin is a stationary or non-stationary origin. For example, determining the location of a user may be based on a location of the user's smartphone. If the current location of the user is different from the location of operation 206, then robot 102 may determine that the origin location changed and that the origin is non-stationary. If there is no change, the origin may be stationary and the process 200 continues to operation 214.

In an operation 210, if there is a change in location, the robot 102 predicts a next location of the user. The prediction may be performed using a variety of techniques including artificial intelligence techniques. Examples of such techniques include, but are not limited to, those described by Ishida, Tom, and Richard E. Korf. "Moving Target Search." In IJCAI, vol. 91, pp. 204-210. 1991. http://www.ijcai.org/Proceedings/91-1/Papers/033.pdf. And Froehlich, Jon, and John Krumm. Route prediction from trip observations. No. 2008-01-0201. SAE Technical Paper, 2008. https://www.cs.umd.edu/~jonf/publications/Froehlich_RoutePredictionFromTripObservations_SAE2008.pdf. Additionally or alternatively, the artificial intelligence techniques may use a prediction algorithm based on statistical models of past user data in order to predict the user's location.

In an operation 212, the robot 212 proceeds toward the predicted next location of the user.

In an operation 214, the robot determines whether it has arrived at the origin. The robot 102 may determine that its location matches an exact location of a smartphone using WIFI or GPS triangulation, a beacon emitted by the device, or by using facial recognition of a person or optical character recognition of a car license plate associated with the person. In some embodiments, the robot 102 may provide a user interface on its screen that a person may use to confirm that the robot has indeed reached the origin. In some instances, the robot 102 may send an electronic message to a smartphone such as an SMS or chat message when it is within a radius of the smartphone, such as 20 meters. The person may approach the robot. If the robot 102 has not reached the origin, the process 200 returns to operation 208.

Once the robot has arrived at the origin, the robot 102 opens and/or unlocks its storage compartment to allow a user to place an item to be delivered to the destination. The robot 102 may wait at the origin until it senses that there is an item in the storage compartment. The robot 102 then closes and/or locks the storage department while in transit.

In an operation 216, if the robot has reached the origin, the robot 102 identifies and proceed to a current location of the destination of the task of operation 202. The operation 216 may be performed as discussed in connection with operations 204-214 where the robot 102 proceeds to the destination instead of proceeding to the origin.

In an operation 218, the robot 201 completes the task after it has arrived at the destination by, for example, authenticating the person receiving the delivery. Authentication may include, for example, requesting and receiving a PIN from the person, matching a voice print of the person, performing a retinal scan of the person, using facial recognition of the person, authenticating a fingerprint of the person, confirming the presence of the smartphone using RFID, requesting that the person swipe a credit card associated with the task, receiving a signature from the person via the touchscreen, scanning a QR code displayed by a smartphone of the person receiving the delivery, or scanning an identification card associated with the person. An identification card may include, for example, a room key, employee badge, or other card containing identifying data on a chip, magnetic strip, RFIC, or other near-field passive or active data transmittal technology. The robot 102 may open and/or unlock the storage compartment and wait in place until the robot 102 senses that the storage compartment is empty. The robot 102 may return to the location of a robot port computer 104 or may receive a new task, thus restarting the process 200.

4. Maps

Figure 3:
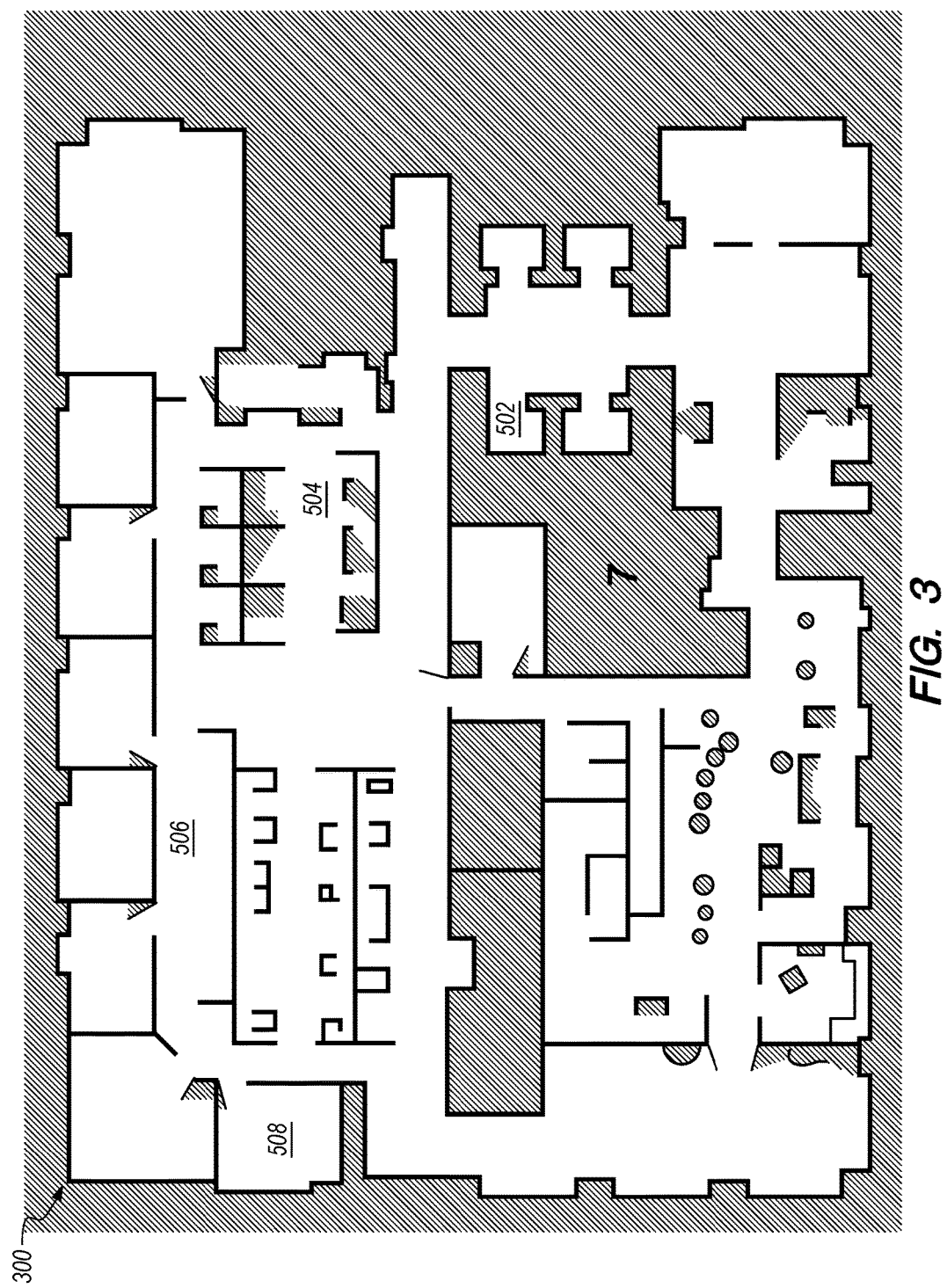
FIG. 3 is an example of a robot-generated map of a floor in a building, according to various embodiments.

FIG. 3 is an example of a robot-generated map 300 of a floor in a building, according to various embodiments. The map 300 includes an annotation of the floor of the building from which the map was generated. In FIG. 3, the map is generated on floor 7. White areas correspond to spaces that are navigable by the robot, including hallway and larger rooms. Gray areas mark areas the robot is unaware of and cannot navigate. Additionally or alternatively, the map may indicate areas that the robot can navigate within, but have a higher cost of doing so. The robot may have to reduce its speed or perform more complex maneuvers when navigating within these areas. These areas may include, for example, bathrooms, small rooms or corners, or cluttered areas. Black lines correspond to interior or exterior walls. An elevator 502 may be used by the robot 102 to navigate between floors.

In an example task, a robot 102 may deliver lunch to a person in a large building. For example, the robot 102 may pick-up an item containing the lunch from an origin at a location on a first floor of a building. The origin may be stationary or non-stationary. The origin may be, for example, a dedicated location from which the robot 102 picks up items for delivery such as a robot port computer 104, a loading area, or a loading compartment, or other designated pick up or drop off area. For example, a vehicle may pull up to a building at a loading zone, and a driver or passenger may place an item in the storage compartment of a robot 102 while remaining in the vehicle or just outside of the vehicle.

The destination of the task may be a worker in the building. For the purpose of illustrating a clear example, assume the worker works on the seventh floor of the building at a cubicle 504. When the robot 102 performs operation 216, the robot 102 determines that its destination is at cubicle 504. The robot 102 proceeds to the seventh floor using elevator 502. While the robot 102 is in the elevator, the robot 102 determines that the worker, and thus its destination, has moved to walkway 506. Using an artificial intelligence prediction algorithm, the robot 102 predicts that the worker is likely to be going to kitchen 508. The robot 102, instead of going to cubicle 504, proceeds to kitchen 508. The robot 102 may use facial recognition to identify the worker corresponding to its destination after robot 102 arrives in the kitchen 508. Additionally or alternatively, robot 102 may use other methods of identification and delivery verification, such as requesting and receiving a PIN from the worker, matching a voice print of the worker, performing a retinal scan of the worker, authenticating a fingerprint of the worker, confirming the presence of the worker's smartphone using RFID, requesting that the worker swipe a credit card associated with the task, by receiving a signature from the person via the touchscreen, or by scanning a QR code displayed by a smartphone. The robot completes its tasks by allowing the worker to remove the item from the storage compartment.

In another task, the user may be a person who is using curbside pick-up to pick-up groceries from a brick-and-mortar store. The origin may be a storeroom or location in the store where the groceries are assembled for placement into robot 102. The robot 102, using GPS tracking of the person via a GPS-enabled smartphone or in-car navigation system, may predict or receive a prediction of when the person will arrive at the store. The robot 102, having knowledge of its transit time from the origin to the curbside pick-up, will time its departure from the storeroom to cause its arrival curbside to coincide with the arrival of the person. For example, assume the person arrives in a car. When the car pulls up to the curbside delivery location or to a queue of cars waiting for groceries, the robot 102 may identify which car to deliver to using the exact location of the car and, for example, OCR recognition of a license plate of the destination car. When the robot 102 arrives at its destination, it unlocks and/or opens its compartment so that the groceries may be loaded into the car.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
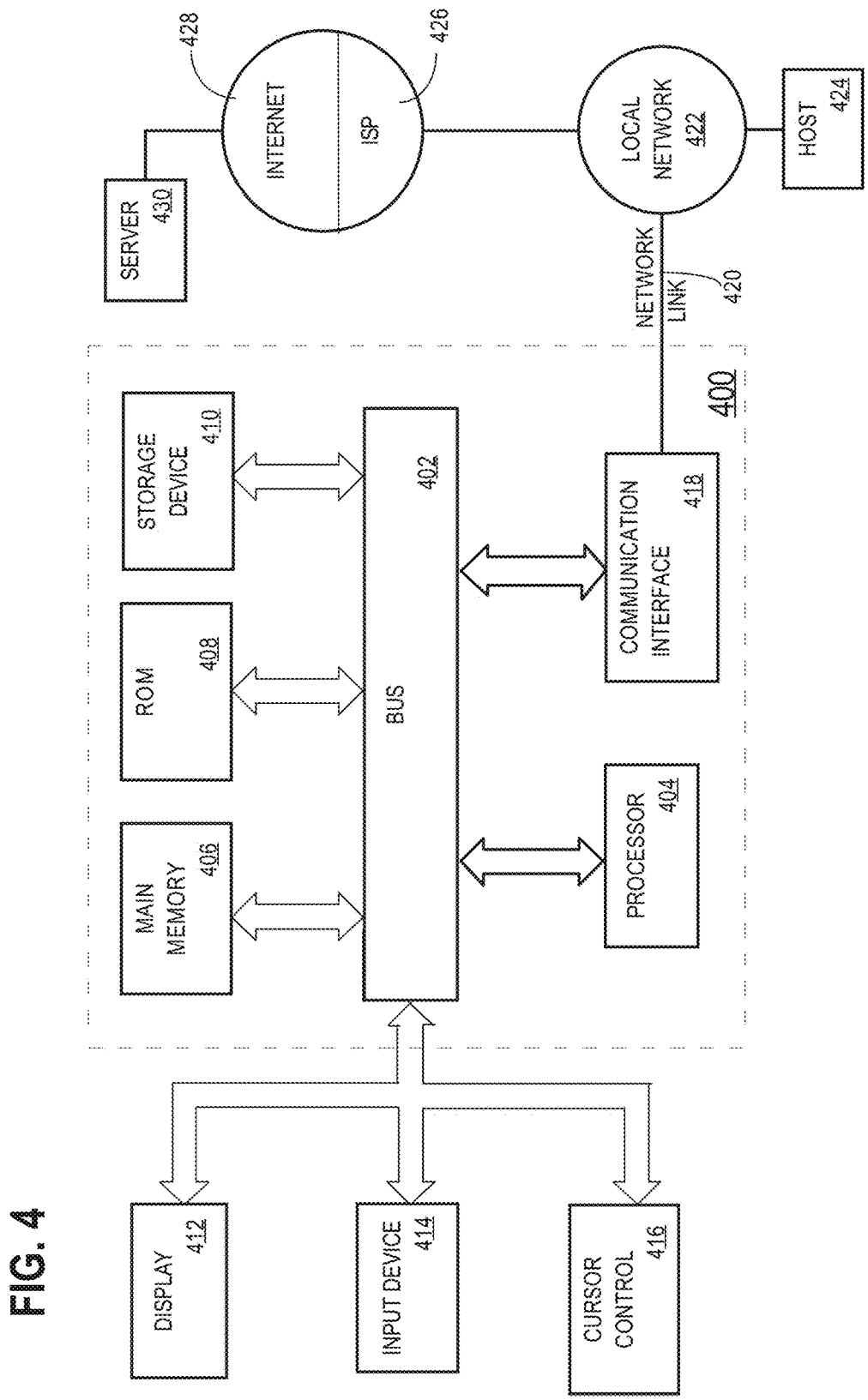
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Display 412 may also be touch-enabled for communicating gestures, touch interactions, and other user interactions to processor 804.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A robot to navigate from a non-stationary origin to a destination within a building, the robot comprising:
   one or more sensors that collect sensor data;
   one or more processors;
   a non-transitory computer-readable medium having instructions embodied thereon, the instructions, when executed by the one or more processors, perform operations comprising:
   receiving a task comprising navigating from a non-stationary origin to a destination;
   identifying a current location of the non-stationary origin by interrogating a remote computer having information about the non-stationary origin for the current location of the non-stationary origin;
   moving towards the current location of the non-stationary origin;
   while moving towards the current location of the non-stationary origin:
     determining that the non-stationary origin has changed location by interrogating the remote computer associated with the non-stationary origin for an updated current location of the non-stationary origin;
     predicting a next location of the non-stationary origin using an artificial intelligence prediction algorithm;
     calculating an updated route to the updated current location of the non-stationary origin;
     moving towards the predicted next location of the non-stationary origin via the updated route;
     determining whether the robot has arrived at the non-stationary origin;
     in response to determining that the robot has not arrived at the non-stationary origin, repeating the determining, predicting, calculating, and moving until the robot has arrived at the non-stationary origin;
   detecting an interaction with the robot that is associated with introducing an item to or removing an item from a storage compartment in the robot;
   moving towards the destination within the building.

2. The robot of claim 1, further comprising determining that the robot is within a radius of the non-stationary origin and, sending to the remote computer, an electronic message indicating that the robot is within the radius.

3. The robot of claim 1, wherein the destination is stationary.

4. The robot of claim 1, wherein the destination is non-stationary.

5. The robot of claim 1, wherein the remote computer is a non-stationary remote computer.

6. The robot of claim 1, wherein the remote computer is a smartphone or vehicle navigation system.

7. The robot of claim 1, wherein the current location of the non-stationary origin is identified using a global positioning system (GPS) or WIFI receiver of the remote computer.

8. The robot of claim 1, wherein the non-stationary origin is a vehicle outside of the building.

9. The robot of claim 1, wherein the non-stationary origin is a person inside or within a distance from the building.

10. The robot of claim 1, further comprising: using the current location of the non-stationary origin, determining a time of arrival of the non-stationary origin at an anticipated location, and delaying moving towards the non-stationary origin based on the time of arrival.

11. A robot to navigate from an origin within a building to a non-stationary destination, the robot comprising:
    one or more sensors that collect sensor data;
    one or more processors;
    a non-transitory computer-readable medium having instructions embodied thereon, the instructions, when executed by the one or more processors, perform operations comprising:
    receiving a task comprising navigation from an origin to a non-stationary destination;
    navigating to the origin;
    at the origin, detecting an interaction with the robot that is associated with introducing an item to a storage compartment of the robot;
    locking the storage compartment;
    identifying a current location of the non-stationary destination by interrogating a remote computer having information about the non-stationary destination for the current location of the non-stationary destination;
    moving towards the current location of the non-stationary destination;
    while moving towards the current location of the non-stationary destination:
      determining that the non-stationary destination has changed location by interrogating the remote computer for an updated current location of the non-stationary destination;
      predicting a next location of the non-stationary destination using an artificial intelligence prediction algorithm;
      calculating an updated route to the updated current location of the non-stationary destination;
      moving towards the predicted next location of the non-stationary destination via the updated route;
    determining whether the robot has arrived at the non-stationary destination;
    in response to determining that the robot has not arrived at the non-stationary destination, repeating the determining, predicting, calculating, and moving until the robot has arrived at the non-stationary destination; unlocking the storage compartment.

12. The robot of claim 11, further comprising determining that the robot is within a radius of the non-stationary destination and, sending to the remote computer, an electronic message indicating that the robot is within the radius.

13. The robot of claim 11, wherein the origin is stationary.

14. The robot of claim 11, wherein the origin is non-stationary.

15. The robot of claim 11, wherein the remote computer is a non-stationary remote computer.

16. The robot of claim 11, wherein the remote computer is a smartphone or vehicle navigation system.

17. The robot of claim 11, wherein the current location of the non-stationary destination is identified using a global positioning system (GPS) or WIFI receiver of the remote computer.

18. The robot of claim 11, wherein the non-stationary destination is a vehicle outside of the building.

19. The robot of claim 11, wherein the non-stationary destination is a person inside or within a distance from the building.

20. The robot of claim 11, further comprising authenticating the destination.

21. The robot of claim 20, wherein authenticating the destination comprises at least one of: requesting and receiving a PIN from a person, matching a voice print of the person, performing a retinal scan of the person, using facial recognition of the person, authenticating a fingerprint of the person, confirming the presence of a smartphone using RFID, requesting that the person swipe a credit card associated with the task, by receiving a signature from the person via a touchscreen, by scanning a QR code displayed by the smartphone, or by scanning an identification card associated with the person.

22. A method for navigating a robot from a non-stationary origin to a destination within a building, the method comprising:
receiving a task comprising navigating from a non-stationary origin to a destination;
identifying a current location of the non-stationary origin by interrogating a remote computer having information about the non-stationary origin for the current location of the non-stationary origin;
moving towards the current location of the non-stationary origin;
while moving towards the current location of the non-stationary origin:
determining that the non-stationary origin has changed location by interrogating the remote computer for an updated current location of the non-stationary origin;
predicting a next location of the non-stationary origin using an artificial intelligence prediction algorithm;
calculating an updated route to the updated current location of the non-stationary origin;
moving towards the predicted next location of the non-stationary origin via the updated route;
determining whether the robot has arrived at the non-stationary origin;
in response to determining that the robot has not arrived at the non-stationary origin, repeating the determining, predicting, calculating, and moving until the robot has arrived at the non-stationary origin;
detecting an interaction with the robot that is associated with introducing an item to or removing an item from a storage compartment in the robot;
moving towards the destination within the building.

* * * * *